March 11, 1952     P. A. FASOLINO     2,588,815
MOTOR VEHICLE SAFEGUARD
Filed July 20, 1949     2 SHEETS—SHEET 1
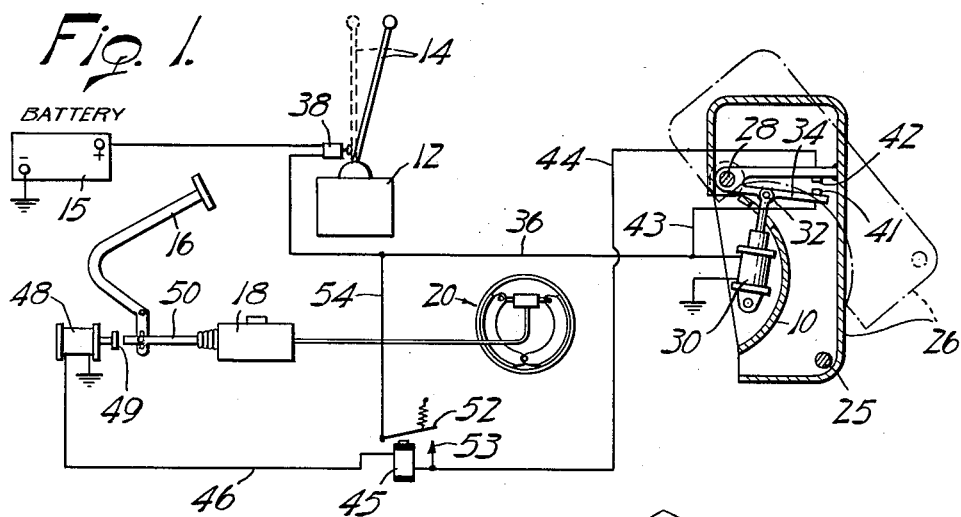
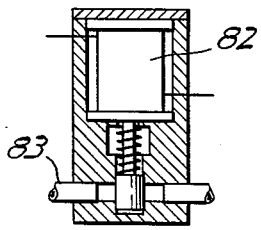
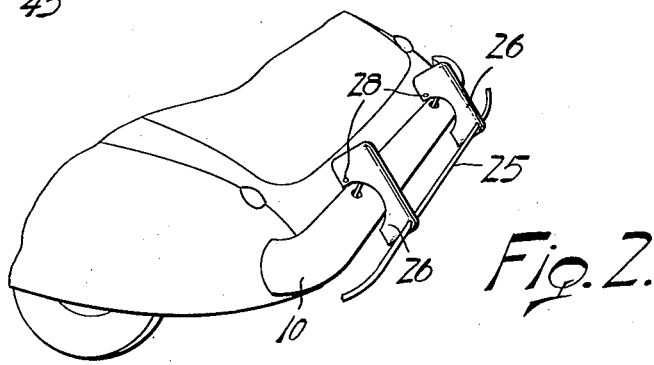
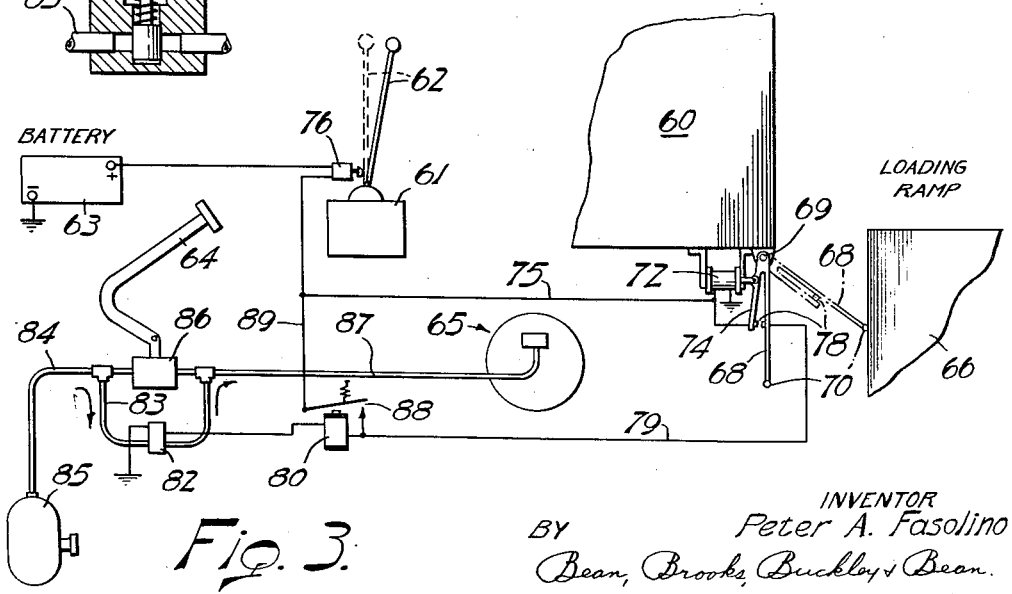
INVENTOR
Peter A. Fasolino
BY
Bean, Brooks, Buckley & Bean.
ATTORNEYS March 11, 1952  P. A. FASOLINO  2,588,815
MOTOR VEHICLE SAFEGUARD Filed July 20, 1949  2 SHEETS—SHEET 2

INVENTOR.
Peter A. Fasolino
BY
Bean, Brooks, Buckley & Bean
ATTORNEYS

Patented Mar. 11, 1952

2,588,815

UNITED STATES PATENT OFFICE 2,588,815

MOTOR VEHICLE SAFEGUARD

Peter A. Fasolino, Buffalo, N. Y.

Application July 20, 1949, Serial No. 105,837

6 Claims. (Cl. 180—82)

This invention relates to automotive vehicle safety devices, and more particularly to improved means for preventing unintended backing of a motor vehicle into an object, so as to prevent personal accidents and/or damage to the vehicle and/or stationary structures when the vehicle driver has improper rearward view.

One of the objects of the invention is to provide an improved mechanism which is operable automatically whenever a motor vehicle is prepared for backing up motion, to detect the presence of any object behind the vehicle as might not be visible to the motor vehicle driver and to automatically apply the vehicle brakes so as to prevent collision with such object.

Another object of the invention is to provide a mechanism for the purposes aforesaid which is highly practical and relatively inexpensive to install.

Another object of the invention is to provide a mechanism of the character aforesaid which is fool-proof and automatic in operation, and which requires no operator attention or adjustments. Other objects and advantages of the invention will appear from the specification hereinafter.

In the drawing:

Fig. 1 is a diagrammatic illustration of an application of the invention to a motor vehicle of the truck or passenger car type having hydraulic type brakes;

Fig. 2 is a fragmentary rear view of an automobile having mounted thereon an obstacle detection device of the invention;

Fig. 3 is a view corresponding to Fig. 1, but showing application of the invention to a vehicle of the type employing compressed air operated brakes;

Fig. 4 is a sectional view through a solenoid control element of the mechanism of Fig. 3.

Figure 5:
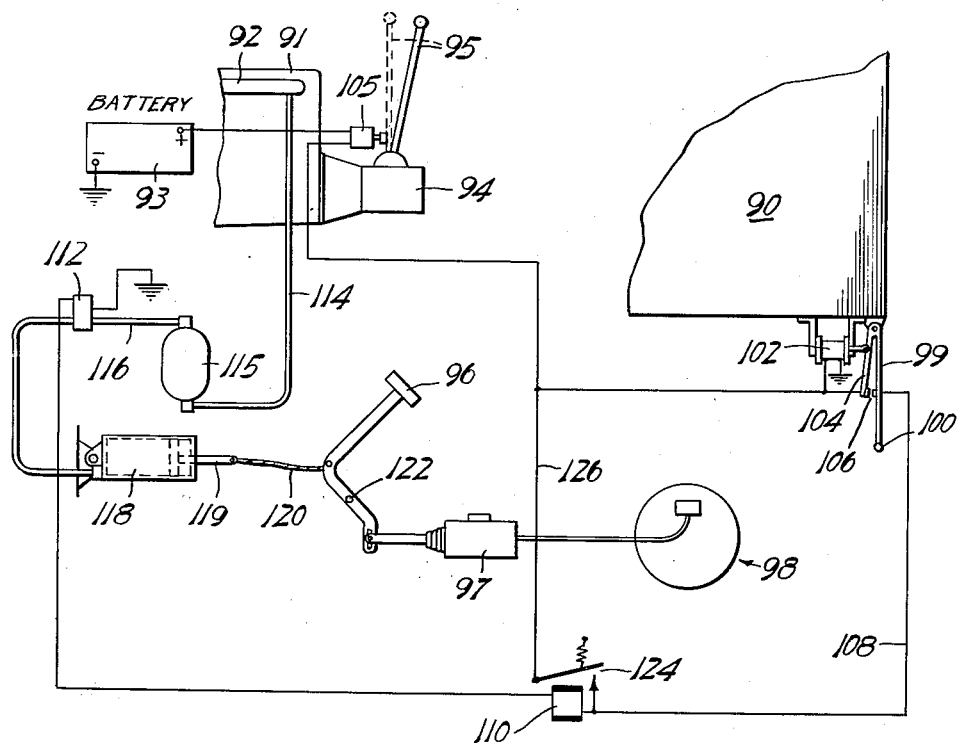
Fig. 5 is a diagrammatic view corresponding to Figs. 1 and 3, showing application of the invention to an automotive vehicle employing engine intake manifold suction to power the brake applying mechanism.

Figs. 1–2 illustrate application of the invention to a vehicle of the automobile type having a back bumper 10; but it will be understood that the invention is equally applicable to any other type motor vehicle. Furthermore, as shown in Fig. 1, for example, the vehicle to which the invention is applied includes the usual transmission gear box 12 and gear shift lever 14; the usual storage battery 15; the usual foot brake pedal 16, a master hydraulic brake cylinder 18, and the usual wheel drum hydraulic brake unit 20.

In any case the invention contemplates mounting upon some convenient rear end portion of the motor vehicle an obstruction "feeler" device such as may comprise as shown in Figs. 1–2 a bar 25 which is arranged to project behind the motor vehicle in such manner as to become contacted by any obstacle therebehind before any other portion of the vehicle meets the obstacle. For example, the bar 25 may be mounted to be carried between a pair of arms 26—26 which pivotally connect as indicated at 28 to the vehicle body, as through the bumper bracket 10. Whereas, the feeler bar 25 might be mounted upon the motor vehicle so as to be the first portion thereof contacted by any obstacle behind the vehicle, the invention contemplates that such "feeler" device should not as a practical matter be disposed under normal forwardly running conditions to extend very far behind the vehicle. However, it should nevertheless extend a substantial distance behind the vehicle whenever the vehicle is backing up so as to allow ample time for the vehicle braking mechanism to halt the vehicle travel subsequent to any contact between the "feeler" and an obstacle behind the vehicle.

Therefore, the present invention contemplates an automatically operating mechanism for projecting the feeler arm 25 to a position rearwardly of its normal position as shown in solid lines in Fig. 1; and as illustrated therein such mechanism may comprise a solenoid 30 which is mounted upon the vehicle structure and pivotally connected as indicated at 32 at its moving end portion to a spring arm 34 which is fixed in cantilever extending relation from a position of rigid support relative to the arms 26. The winding of the solenoid 30 is connected in series with the storage battery 15 by means of suitable ground connections and a conductor 36 which includes a normally open spring-biased switch 38. The switch 38 is arranged adjacent the gear shift lever 14 in such manner that whenever the latter is displaced into "reverse gear" position the switch 38 is thereupon closed so that the solenoid 30 is energized by the storage battery 15. This causes the armature of the solenoid to project outwardly and to press upwardly against the spring arm 34, thereby pivoting the arms 26 in clockwise direction as to the broken line position thereof shown in Fig. 1, whereby the feeler bar 25 is projected further rearwardly from the vehicle body.

Thus, as long as the gear shift lever 14 is maintained in "reverse" position the solenoid is energized to hold the feeler bar outwardly in its projected position. However, as explained hereinabove the arm 34 is somewhat resilient, and consequently if the vehicle backs up into an obstruction the arm 34 deflects so as to permit the feeler assembly to pivot in clockwise direction above the pivot axis 28 although the solenoid 30 continues to operate to hold the arm 34 in its upward position. The arm 34 is fitted with an electrical contact 41 and a similar contact 42 is provided on the feeler structure so that whenever the latter is depressed against the action of the solenoid the contacts 41—42 engage.

An electrical conductor 43 connects the contact 41 to the conductor 36, and a conductor 44 connects the contact 42 to the winding of a relay 45; the other end of the relay winding being connected through conductor 46 to a power solenoid 48, the other end of the winding of which leads to ground. The armature 49 of the solenoid 48 is arranged to project upon energization of the solenoid 48 so as to bear against the master brake cylinder operating rod 50, thereby setting the brake 20. Therefore, it will be appreciated that immediately upon contact between the feeler rod 25 and any obstacle behind the vehicle the contacts 41—42 will close and will thereby cause the vehicle brakes to be "set." Simultaneously, the relay 45 will be energized so as to close the contacts 52—53 thereof so that a shunt conductor 54 which leads from the contact 52 to the conductor 36 will close a circuit comprising the storage battery 15, the switch 38, the relay 45, and the brake actuating solenoid 48. Hence, even though the feeler 25 be immediately released, such as by toppling over of a person previously backed into by the feeler, the brake system will remain "set" until such time as the vehicle operator retracts the gear shift lever 14 from "reverse" position.

Consequently, only momentary contacts of the feeler 25 with obstacles behind the vehicle will suffice to set and permanently lock the vehicle braking system until such time as the operator moves the gear shift lever out of "reverse" position. However, it will be appreciated that this mechanism in no way interferes with instantaneous and full control of the motor vehicle for operation in any direction other than in reverse. Thus, the operator may have prompt control of the vehicle for forward motion such as may be sometimes required in order to run the vehicle off of an obstacle such as may have been previously run upon.

Figs. 3-4 illustrate another form of application of the invention as to a vehicle comprising a body portion 60 having the usual gear box 61, gear shift lever 62, storage battery 63, foot brake pedal 64, and wheel drum compressed air brake unit 65. In this case an obstruction in the form of a loading ramp is illustrated at 66 to be in juxtaposition behind the vehicle, and the feeler mechanism is illustrated to comprise an arm device 68 which is pivotally mounted at 69 upon the vehicle body and carrying at its outer end a feeler bar 70. The arm 68 is arranged to be actuated by means of a solenoid 72 through the medium of a spring arm 74 and a conductor 75 including a normally spring-biased switch 76 which is arranged to be actuated by the gear shift lever 62 whenever the latter is moved into "reverse" position. Thus, whenever the gear shift lever is shifted into reverse position the solenoid 72 is energized by the battery 63 so as to pivot the arm 68 in counterclockwise direction and outwardly so as to project the feeler bar 70 behind the vehicle as to the broken line position thereof shown in Fig. 3.

The arms 68—74 carry contact devices at 78 which connect through a conductor 79 leading through a relay coil 80 to a solenoid controlled air valve 82. The valve 82 is disposed in a by-pass airline 83 which connects to a conduit 84 leading from a compressed air supply tank 85 which normally feeds through a pedal operated valve 86 to the supply conduit 87 of the air brake system 65. Thus, whereas normal operation of the braking system is accomplished by depression of the pedal 64, whenever an obstruction meets the feeler bar 70 the contacts 78 are thereby closed so as to energize the solenoid valve 82 which permits compressed air to by-pass the valve 86 and to move to the brake unit 65. As in the case of the relay device of Fig. 1, the relay 80 of Fig. 3 simultaneously operates to close its contacts 88 and to thereby close a circuit including a conductor 89 and the storage battery 63 and the switch 76 and the solenoid air valve 82. Thus, once the feeler 70 has been actuated to set the brake, the brake system will remain closed until the vehicle operator withdraws the gear shift lever 62 from its "reverse" position. Fig. 3 illustrates diagrammatically the solenoid air valve device 82.

Fig. 5 illustrates application of the invention to a motor vehicle including a body portion 90, an engine 91 having an intake manifold 92, a storage battery 93, a gear box 94, a gear shift lever 95, a foot brake pedal 96, a brake master cylinder 97, and a conventional wheel drum hydraulic brake unit 98. As in the case of Fig. 3, the feeler unit is illustrated to comprise a pivoted arm 99 carrying a feeler bar 100 and arranged to be actuated by means of a solenoid 102 through a spring arm 104. The solenoid 102 is arranged to be controlled by a normally open switch 105 which is actuated to its closed position whenever the gear shift lever 95 is moved into "reverse." Thus, whenever the gear shift lever 95 is moved into reversed position the feeler 100 is projected to a position rearwardly of the motor vehicle. The feeler arms 99—104 carry contacts at 106 which close whenever the feeler bar 100 meets with an obstruction, thereby completing a circuit including a conductor 108, a relay 110, a solenoid valve 112, and a storage battery 93.

The solenoid valve 112 is arranged to control the application of "vacuum" from the intake manifold 92 of the engine 91 through a conduit 114 which is in connection with a storage reservoir 115. For this purpose the valve 112 is connected to control a conduit leading from the accumulator 115 to a pneumatic cylinder 118; the piston member 119 thereof being connected through means of a flexible cable 120 to the foot pedal 96 so as to cause the latter to pivot about its pivotal connection 122 so as to set the brake 98 whenever the contacts 106 are closed. Simultaneously, the relay 110 closes its contacts 124 so as to complete a shunt circuit including a conductor 126 which by-passes the contacts 106. Therefore, even though the pressure applied against the feeler bar 100 is only momentary, the mechanism immediately operates to "set" the vehicle braking system and to maintain it in braking condition until such time as the operator moves the gear shift lever 95 out of "reverse" position. Thereupon the relay 110 is deenergized so as to permit the contacts thereof to open, whereupon the mechanism is reset for repetition of the operation as described.

Thus, it will be appreciated that the invention contemplates an application to any automotive vehicle employing any conventional type of braking system, of an improved feeler mechanism which automatically projects rearwardly of the motor vehicle whenever the gear shift lever thereof is moved into "reverse" position; whereby whenever the feeler device meets with any obstruction the braking system of the vehicle is immediately set and maintained in set position until such time as the operator removes the gear shift lever from "reverse" position. Hence, the invention provides important improved safety features such as are not found in the prior art; and it will of course be appreciated that although only a few forms of the invention have been shown and described in detail herein it will be apparent to those skilled in the art that the invention is not so limited but that various changes may be made therein without departing from the spirit of the invention or the scope of the appended claims.

I claim:

1. In a motor vehicle, a wheel brake device, means operative to set said brake device, said vehicle including a gear shift lever arranged to be moved into "reverse" position to cause said vehicle to operate in backward direction, an obstacle feeler member mounted upon said vehicle for movement relative thereto between extended and retracted positions and disposed normally in a retracted position thereon, means actuated by movement of said gear shift lever into "reverse" position to cause said feeler member to move into a projected position reaching outwardly of said vehicle, and to cause retraction thereof when said lever is removed from "reverse" position, and means responsive to application of pressure against said feeler member when said feeler member is in said projected position to cause said brake actuating means to operate to set the vehicle brake system.

2. In a motor vehicle, a wheel brake device, means operative to set said brake device, said vehicle including a gear shift lever arranged to be moved into a prescribed position to cause said vehicle to operate in a prescribed direction, an obstacle feeler member mounted upon said vehicle for movement relative thereto between extended and retracted positions and disposed normally in a retracted position thereon, means actuated by movement of said gear shift lever into said position to cause said feeler member to move into a projected position reaching outwardly of said vehicle, and means responsive to application of pressure against said feeler member when said feeler member is in said projected position to cause said brake actuating means to operate to set the vehicle brake system.

3. A vehicle safety device for a motor vehicle having a gear shift lever and a first switch operable thereby, said device comprising a feeler member mounted upon the vehicle for movement relative thereto between extended and retracted positions and normally carried in a retracted position, means operable automatically upon actuation of said first switch responsive to disposition of the vehicle gear shift lever into reverse position to cause said feeler member to be projected from its retracted position into an extended position reaching from said vehicle therebeyond, a second switch carried by said feeler member responsive to application of pressure thereon to close a first circuit when said gear shift lever is in said reverse position, said first circuit including a source of electrical power and electromagnetic means operable to set the braking system of said vehicle, and a relay device operable upon energization of said first circuit to close a shunt circuit maintaining said electromagnetic means energized irrespective of the subsequent condition of said second switch so as to maintain said brake actuating device in operative condition until such time as said first circuit is broken responsive to actuation of said first switch by removal of the vehicle gear shift lever from "reverse" position.

4. A vehicle safety device comprising a feeler member carried by a vehicle having a gear shift lever, a normally open first switch arranged to be closed upon movement of said gear shift lever to "reverse" position, said feeler member being movable on said vehicle between retracted and extended positions, a second switch carried by said feeler member responsive to application of pressure thereon to close a first circuit in series with said first switch, said first circuit including a source of electrical power and electromagnetic means operable to set the braking system of said vehicle, and a relay device operable upon energization of said electromagnetic means to close a shunt circuit maintaining said electromagnetic means energized irrespective of the subsequent condition of said second switch so as to maintain said brake actuating device in operative condition until such time as said first circuit is broken responsive to actuation of said first switch by removal of the vehicle gear shift lever from "reverse" position.

5. In a vehicle having a gear shift lever, a vehicle safety device comprising a feeler member mounted upon the vehicle for movement relative thereto between extended and retracted positions and disposed in a normally retracted position thereon, first switch means connected to a source of electrical power and closable automatically upon and during disposition of the vehicle gear shift lever in "reverse" position to energize means to cause said feeler member to be projected from its retracted position into a position reaching from said vehicle therebeyond, second switch means carried by said feeler member responsive to application of pressure thereon to close a first circuit in series with said first switch means, said circuit including electric means operable to set the braking system of said vehicle and a relay device, said relay device being operable upon energization of said first circuit to close a shunt circuit maintaining the electric braking system setting portion of said first circuit energized irrespective of the subsequent condition of said second switch means so as to maintain said brake actuating electric means in operative condition until such time as the vehicle gear shift lever is removed from "reverse" position.

6. In a motor vehicle, a wheel brake device, means operative to set said brake device, said vehicle including a gear shift lever arranged to be moved into a prescribed position to cause said vehicle to operate in a prescribed direction, an obstacle feeler member mounted upon said vehicle for movement relative thereto between extended and retracted positions and disposed in a normally retracted position thereon, means actuated by movement of said gear shift lever into said position to cause said feeler member to move into a projected position reaching outwardly of said vehicle, and means responsive to application of pressure against said feeler member when said feeler member is in said projected position to cause said brake actuating means to operate to set the vehicle brake system, and means operable upon such setting of said brake system to maintain said brake system in set condition until said gear shift lever is removed from said prescribed position.

PETER A. FASOLINO.

REFERENCES CITED

The following references are of record in the file of this patent:

UNITED STATES PATENTS

| Number | Name | Date |
| --- | --- | --- |
| 1,618,880 | Johnson | Feb. 22, 1929 |
| 1,758,854 | Schauman | May 13, 1930 |
| 1,823,950 | Mechetti | Sept. 22, 1931 |
| 2,232,726 | Perez | Feb. 25, 1941 |
| 2,478,884 | Wiseley | Aug. 9, 1949 |